(12) United States Patent
Yang et al.

(10) Patent No.: US 10,355,956 B2
(45) Date of Patent: Jul. 16, 2019

(54) SPECTRAL MASKING FOR WIDEBAND WIRELESS LOCAL AREA NETWORK TRANSMISSIONS

(71) Applicant: QUALCOMM Incorporated, San Diego, CA (US)

(72) Inventors: Lin Yang, San Diego, CA (US); Bin Tian, San Diego, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/260,131

(22) Filed: Sep. 8, 2016

(65) Prior Publication Data

US 2017/0126529 A1   May 4, 2017

Related U.S. Application Data

(60) Provisional application No. 62/248,985, filed on Oct. 30, 2015.

(51) Int. Cl.
*H04L 12/26* (2006.01)
*H04W 72/04* (2009.01)
*H04W 52/36* (2009.01)
*H04L 27/26* (2006.01)
*H04W 84/12* (2009.01)
*H04W 88/02* (2009.01)

(52) U.S. Cl.
CPC .......... *H04L 43/0876* (2013.01); *H04L 43/18* (2013.01); *H04W 52/367* (2013.01); *H04W 72/0453* (2013.01); *H04L 27/2602* (2013.01); *H04W 84/12* (2013.01); *H04W 88/02* (2013.01)

(58) Field of Classification Search
CPC .... G01R 23/16; H04W 52/36; H04W 52/367; H04W 72/0453; H04L 43/0876; H04L 43/18
See application file for complete search history.

(56) References Cited

U.S. PATENT DOCUMENTS 9,888,525 B2 * 2/2018 Bhukania ............ H04L 27/0008
2012/0263090 A1 * 10/2012 Porat .................... H04L 1/0003
370/312

(Continued)

OTHER PUBLICATIONS

Litepoint—Teradyne Co., "IEEE 802.11ac: What Does it Mean for Test?", Oct. 2013, Doc:1075-0020-001, pp. 1-15 (Year: 2013).*

(Continued)

*Primary Examiner* — Redentor Pasia
(74) *Attorney, Agent, or Firm* — Holland & Hart LLP

(57) ABSTRACT

Methods, systems, and devices are described for wireless communications. A wireless station includes a transmitter to generate a wideband contiguous waveform in a band. The transmitter transmits the waveform that conforms to spectral masking attributes and spectral flatness attributes. The wireless station, or another device supporting spectrum analysis functions, detects a wideband contiguous waveform and performs spectrum analysis of the waveform. The wireless station includes a resolution bandwidth of 25 KHz and a video bandwidth of 7.5 KHz.

20 Claims, 9 Drawing Sheets

(56) References Cited

U.S. PATENT DOCUMENTS

| | | | | |
|---|---|---|---|---|
| 2013/0343433 | A1* | 12/2013 | Yang | H04B 1/707 375/146 |
| 2013/0343478 | A1* | 12/2013 | Yang | H04L 27/2602 375/295 |
| 2014/0126398 | A1* | 5/2014 | Kim | H04L 5/0057 370/252 |
| 2015/0163680 | A1* | 6/2015 | Valliappan | H04W 16/14 370/329 |
| 2015/0349995 | A1* | 12/2015 | Zhang | H04L 5/0048 375/295 |
| 2016/0007342 | A1* | 1/2016 | Seok | H04B 7/0452 370/338 |

OTHER PUBLICATIONS

Acar, et al., "Enhanced Error Vector Magnitude (EVM) Measurements for Testing WLAN Transceivers," Computer-Aided Design, IEEE/ACM International Conference on Computer-Aided Design, Nov. 5, 2006, pp. 210-216, XP058136733, IEEE Press, 445 Hoes Lane, P.O. Box 1331, Piscataway, NJ 08855-1331 USA.

Konig, et al., "Distributed Indoor Spectrum Occupancy Measurements in the UHF TV Band," 2014 IEEE, International Conference on Communications (ICC), Jun. 10, 2014, 6 pgs, XP032632604, Institute of Electrical and Electronics Engineers.

ISA/EP, International Search Report and Written Opinion of the International Searching Authority, Int'l Application No. PCT/US2016/051110, dated Mar. 30, 2017, European Patent Office, Rijswijk, NL, 20 pgs.

QUALCOMM Europe, "Spectrum Emission Mask for DC-HSUPA," 3GPP TSG-RAN WG4 Meeting #51bis, R4-092271, Los Angeles, CA, USA, Jun. 29-Jul. 2, 2009, 18 pgs., XP050353516, 3rd Generation Partnership Project, Mobile Competence Centre, 650, Route Des Lucioles, F-06921, Sophia-Antipolis, Cedex, France.

ISA/EPO, Partial International Search Report of the International Searching Authority, Int'l. App. No. PCT/US2016/051110, dated Dec. 9, 2016, European Patent Office, Rijswijk, NL, 7 pgs.

Porat et al., "Spectral Mask Flatness," IEEE Draft, Sep. 13, 2010, 8 pgs., vol. 802.11 ac, No. 1, doc.: IEEE 802.11-10/1109r1, XP017676159, IEEE-SA Mentor, Piscataway, NJ, USA [retrieved on Sep. 15, 2010].

Lee et al., "IEEE P802.11 Wireless LANs: Comment Resolution for CIDS on PHY Transmit Spec.," IEEE, Sep. 12, 2016, 15 pgs., doc.: IEEE 802.11-16/1191r2, XP055324544, Retrieved from the Internet: URL:https://mentor.ieee.org/802.11/dcn/16/11-16-1191-02-00ax-comment-resolution-for-cids-on-phy-transmit-spec.docx [retrieved on Nov. 30, 2016].

* cited by examiner

SPECTRAL MASKING FOR WIDEBAND WIRELESS LOCAL AREA NETWORK TRANSMISSIONS

CROSS REFERENCES

The present Application for Patent claims priority to U.S. Provisional Patent Application No. 62/248,985 by Yang, et al., entitled "Spectral Masking For Wideband Wireless Local Area network Transmissions," filed Oct. 30, 2015, assigned to the assignee hereof.

BACKGROUND

Field of the Disclosure

The present disclosure, for example, relates to wireless communication systems, and more particularly to aspects of a spectral mask, flatness, and analysis techniques for a wireless local area network.

Description of Related Art

Wireless communications systems are widely deployed to provide various types of communication content such as voice, video, packet data, messaging, broadcast, and so on. These systems can be multiple-access systems capable of supporting communication with multiple users by sharing the available system resources (e.g., time, frequency, and power). A Wireless Local Area Network (WLAN), such as a Wi-Fi network (IEEE 802.11) includes an access point (AP) that communicates with one or more stations (STAs) or mobile devices. The AP can be coupled to a network, such as the Internet, and enable a STA to communicate via the network (and/or communicate with other devices coupled to the access point).

Wireless communications systems operate by devices transmitting wireless waveforms over-the-air in an available radio frequency spectrum band. The device, e.g., STAs and access points, typically includes a transmitter to configure and transmit the waveform and a receiver to receive the waveform and decode the encoded information in the waveform. Transmitted waveforms are signal(s) that occupy the medium (e.g., introduce energy onto the medium), which can result in interference in adjacent and/or alternate radio frequency spectrum bands. For example, in wideband transmissions that occupy more than one band (or channel), the parameters of the waveform can determine the amount of interference in neighboring bands. Increased interference can lower physical layer transfer rates and reduce medium reuse for other devices.

SUMMARY

The present description discloses techniques for spectral masking, flatness, and analysis of waveforms used for wireless local area network (WLAN) communications. According to these techniques, a WLAN radio of a station (STA) and/or access point (AP) includes a transmitter that transmits waveforms conforming to the presently described waveform parameters. For example, the WLAN radio, or at least a transmitter of the radio, generates a wideband contiguous waveform. The waveform includes waveform parameters such as a bandwidth and a center frequency. The transmitter transmits the waveform according to a spectral mask that is associated with the waveform parameters. The waveform can be a wideband contiguous waveform having a bandwidth of 160 MHz. The spectral mask includes rolloff portions, each rolloff portion having an associated slope.

The spectral mask includes three rolloff portions for each side of the waveform (e.g., the leading and trailing edges of the waveform). In a first example, the three rolloff portions can be associated with a 0 decibel relative to reference (dBr) power level at +/−79.5 MHz, a −20 dBr power level at +/−80.5 MHz, a −28 dBr power level at +/−160 MHz, and a −40 dBr power level at +/−240 MHz, relative to the center frequency of the waveform. In a second example, the three rolloff portions can be associated with a 0 dBr power level at +/−79.5 MHz, a −20 dBr power level at +/−80.5 MHz, a −28 dBr power level at +/−120 MHz, and a −40 dBr power level at +/−160 MHz, relative to the center frequency of the waveform. In a third example, the three rolloff portions can be associated with a 0 dBr power level at +/−79.5 MHz, a −20 dBr power level at +/−80.5 MHz, a −34 dBr power level at +/−160 MHz, and a −40 dBr power level at +/−240 MHz, relative to the center frequency of the waveform.

Other aspects of the present description disclose techniques for spectral flatness attributes of the waveform. The waveform includes a wideband contiguous waveform having bandwidths of 20/40/80/160/80+80 MHz. The transmitter generates and transmits the waveform that conforms to spectral flatness attributes. Example spectral flatness attributes include, but are not limited to, a maximum deviation parameter for the inner region of the bandwidth, a maximum deviation parameter for an intermediate region of the bandwidth, and a maximum deviation parameter for an outer region of the bandwidth. The deviation parameters are based on a power level and/or a carrier index for the bandwidth.

Further aspects of the present description disclose techniques for spectrum analysis of the waveform. The waveform is a wideband contiguous waveform having bandwidths of 20/40/80/160/80+80 MHz. The spectrum analysis includes a resolution bandwidth for the spectrum analyzer and/or a video bandwidth of the spectrum analyzer. An example resolution bandwidth is 25 KHz and an example video bandwidth is 7.5 KHz.

A method for wireless communication is described. The method includes generating, by a wireless communication device, a wideband contiguous waveform including a predefined band including a bandwidth ($\beta$), and a center frequency ($f_c$), and transmitting the wideband contiguous waveform using a transmitter conforming to a spectral mask, where the spectral mask includes a 0 dBr bandwidth of 159 MHz, a −20 dBr point at an 80.5 MHz frequency offset from a center frequency, a −28 dBr point at a 160 MHz frequency offset from the center frequency, and a −40 dBr point at 240 MHz frequency offset and higher from the center frequency. $\beta$ can be 160 MHz.

A method for wireless communication is described. The method includes generating, by a wireless communication device, a wideband contiguous waveform including a predefined band including a bandwidth ($\beta$), and a center frequency ($f_c$), and transmitting the wideband contiguous waveform using a transmitter conforming to a spectral mask, where the spectral mask includes a 0 dBr bandwidth of 159 MHz, a −20 dBr point at an 80.5 MHz frequency offset from a center frequency, a −28 dBr point at a 120 MHz frequency offset from the center frequency, and a −40 dBr point at a 160 MHz frequency offset and higher from the center frequency. $\beta$ can be 160 MHz.

A method for wireless communication is described. The method includes generating, by a wireless communication device, a wideband contiguous waveform including a predefined band including a bandwidth ($\beta$), and a center frequency ($f_c$), and transmitting the wideband contiguous waveform using a transmitter conforming to a spectral mask, where the spectral mask includes a 0 dBr bandwidth of 159 MHz, a −20 dBr point at an 80.5 MHz frequency offset from a center frequency, a −34 dBr point at a 160 MHz frequency offset from the center frequency, and a −40 dBr point at a 240 MHz frequency offset and higher from the center frequency. β can be 160 MHz.

A method for wireless communication is described. The method includes generating, by a wireless communication device, a WLAN waveform over a bandwidth (β), and transmitting the waveform using a transmitter conforming to a predefined spectral flatness attribute, where the predefined spectral flatness attribute includes a first maximum deviation parameter defined for an inner region of the bandwidth, and a second maximum deviation parameter defined for an outer region of the bandwidth.

The first maximum deviation parameter and the second maximum deviation parameter can be equal to +4/−6 dB. When β=160 MHz, the inner region can be defined by subcarriers from −696 to −515, from −509 to −166, from +166 to +509, and from +515 to +696 from a center frequency of the bandwidth, and the outer region can be defined by subcarriers from −1012 to −697, from −165 to −12, from +12 to +165, and from +697 to +1012 from the center frequency of the bandwidth.

When β=80 MHz, the inner region can be defined by subcarriers from −344 to −3 and from +3 to +344 from a center frequency of the bandwidth, and the outer region can be defined by subcarriers from −500 to −345 and from +345 to +500 from the center frequency of the bandwidth. When β=40 MHz, the inner region can be defined by subcarriers from −168 to −3 and from +3 to +168 from a center frequency of the bandwidth, and the outer region can be defined by subcarriers from −244 to −169 and from +169 to +244 from the center frequency of the bandwidth. When β=20 MHz, the inner region can be defined by subcarriers from −84 to −2 and from +2 to +84 from a center frequency of the bandwidth, and the outer region can be defined by subcarriers from −122 to −85 and from +85 to +122 from the center frequency of the bandwidth.

A method for wireless communication at a spectrum analyzer device is described. The method includes detecting a WLAN waveform over a contiguous bandwidth (β), and performing a spectrum analysis on the WLAN waveform, where a resolution bandwidth of the spectrum analyzer device is substantially equal to 25 kHz. A video bandwidth of the spectrum analyzer device during the spectrum analysis can be substantially equal to 7.5 kHz. β is substantially equal to at least one of 20 MHz, 40 MHz, 80 MHz, 160 MHz, or 80+80 MHz.

An apparatus for wireless communication is described. The apparatus includes a wireless communication device to generate a wideband contiguous waveform including a predefined band including a bandwidth (β), and a center frequency ($f_c$), and a transmitter to transmit the wideband contiguous waveform conforming to a spectral mask, where the spectral mask includes a 0 dBr bandwidth of 159 MHz, a −20 dBr point at an 80.5 MHz frequency offset from a center frequency, a −28 dBr point at a 160 MHz frequency offset from the center frequency, and a −40 dBr point at 240 MHz frequency offset and higher from the center frequency β can be 160 MHz.

An apparatus for wireless communication is described. The apparatus includes a wireless communication device to generate a wideband contiguous waveform including a predefined band including a bandwidth (β), and a center frequency ($f_c$), and a transmitter to transmit the wideband contiguous waveform conforming to a spectral mask, where the spectral mask includes a 0 dBr bandwidth of 159 MHz, a −20 dBr point at an 80.5 MHz frequency offset from a center frequency, a −28 dBr point at a 120 MHz frequency offset from the center frequency, and a −40 dBr point at a 160 MHz frequency offset and higher from the center frequency. β can be 160 MHz.

An apparatus for wireless communication is described. The apparatus includes a wireless communication device to generate a wideband contiguous waveform including a predefined band including a bandwidth (β), and a center frequency ($f_c$), and a transmitter to transmit the wideband contiguous waveform conforming to a spectral mask, where the spectral mask includes a 0 dBr bandwidth of 159 MHz, a −20 dBr point at an 80.5 MHz frequency offset from a center frequency, a −34 dBr point at a 160 MHz frequency offset from the center frequency, and a −40 dBr point at a 240 MHz frequency offset and higher from the center frequency. β can be 160 MHz.

An apparatus for wireless communication is described. The apparatus includes a wireless communication device to generate a WLAN waveform over a bandwidth (β), and a transmitter to transmit the waveform conforming to a predefined spectral flatness attribute, where the predefined spectral flatness attribute includes a first maximum deviation parameter defined for an inner region of the bandwidth, and a second maximum deviation parameter defined for an outer region of the bandwidth.

The first maximum deviation parameter and the second maximum deviation parameter are equal to +4/−6 dB. When β=160 MHz, the inner region can be defined by subcarriers from −696 to −515, from −509 to −166, from +166 to +509, and from +515 to +696 from a center frequency of the bandwidth, and the outer region can be defined by subcarriers from −1012 to −697, from −165 to −12, from +12 to +165, and from +697 to +1012 from the center frequency of the bandwidth. When β=80 MHz, the inner region can be defined by subcarriers from −344 to −3 and from +3 to +344 from a center frequency of the bandwidth, and the outer region can be defined by subcarriers from −500 to −345 and from +345 to +500 from the center frequency of the bandwidth. When β=40 MHz, the inner region can be defined by subcarriers from −168 to −3 and from +3 to +168 from a center frequency of the bandwidth, and the outer region can be defined by subcarriers from −244 to −169 and from +169 to +244 from the center frequency of the bandwidth. When β=20 MHz, the inner region can be defined by subcarriers from −84 to −2 and from +2 to +84 from a center frequency of the bandwidth, and the outer region can be defined by subcarriers from −122 to −85 and from +85 to +122 from the center frequency of the bandwidth.

An apparatus for wireless communication at a spectrum analyzer device is described. The apparatus includes an antenna to detect a WLAN waveform over a bandwidth (β), and a spectrum analysis component to perform a spectrum analysis on the WLAN waveform, where a resolution bandwidth of the spectrum analyzer device is substantially equal to 25 kHz. A video bandwidth of the spectrum analyzer device during the spectrum analysis can be substantially equal to 7.5 kHz. β can be substantially equal to at least one of 20 MHz, 40 MHz, 80 MHz, 160 MHz, or 80+80 MHz.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
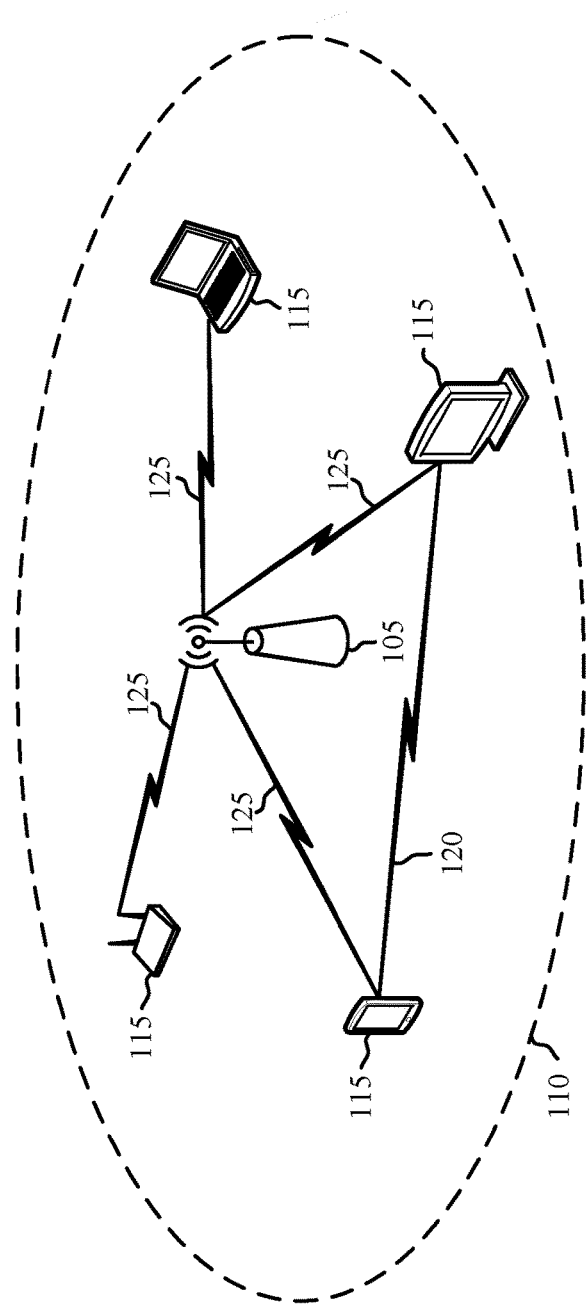
FIG. 1 shows a block diagram of a wireless communication system, in accordance with various aspects of the present disclosure.

Wireless Local Area Network (WLAN) transmissions (also referred to as Wi-Fi transmissions) can result in undesirable interference on neighboring channels. Various attributes of the WLAN waveform determine the amount and type of interference the waveform causes. The power spectral density (PSD) of the waveform generally defines the power of the waveform signal distributed over frequencies of the waveform. The characteristics of the rolloff portions of the waveform determine the extent of interference caused on adjacent and/or alternate channels. Such waveform attributes contribute to the amount of interference, e.g., out-of-band interference.

According to aspects of the present disclosure, a wireless device includes a transmitter configured to transmit a WLAN waveform that conforms to certain waveform attributes. The waveform is a contiguous wideband with a 160 MHz bandwidth, i.e., the waveform occupies eight adjacent 20 MHz bands of the radio frequency spectrum bands. Each 20 MHz band includes multiple sub-carriers or tones. The waveform is a 5 GHz WLAN transmission. The waveform attributes include a spectral mask of the waveform that includes three slopes. The three slopes generally define the profile or 'skirt' of the waveform. Broadly, the slope(s) of the leading and trailing edges of the waveform determine the acceptable power levels being transmitted in the adjacent bands, with reference to the transmitted power across the waveform bandwidth.

According to other aspects, the transmitter is also configured to transmit the waveform conforming to waveform attributes associated with a spectral flatness attribute. The spectral flatness attributes include maximum deviation parameters for the inner, intermediate, and outer regions of the bandwidth of the waveform. The regions of the bandwidth is defined with respect to the number of sub-carriers or tones from the center frequency of the waveform.

According to other aspects, the wireless device is configured to perform spectral analysis of the described transmitted waveform, e.g., the contiguous wideband waveforms having bandwidths of 20/40/80/160/80+80 MHz. The device, e.g., a spectrum analyzer component of the device, supports a 25 KHz resolution bandwidth and/or a 7.5 KHz video bandwidth. The resolution and/or video bandwidth attributes provide sufficient resolution for the device to perform spectral analysis of the waveform that conforms to the spectral masking and/or flatness attributes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 in accordance with various aspects of the present disclosure. The WLAN 100 includes an access point (AP) 105 and stations (STAs) 115. While only one AP 105 is illustrated, the WLAN 100 can have multiple APs 105. The STAs 115 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. STAs 115 can also be referred to as mobile stations (MS), mobile devices, access terminals (ATs), user equipment (UEs), subscriber stations (SSs), or subscriber units. The STAs 115 associate and communicate with the AP 105 via communication links 125. Each AP 105 has a coverage area 110 such that STAs 115 within that area are within range of the AP 105. The STAs 115 are dispersed throughout the coverage area 110. STAs 115 can be stationary or mobile. Some APs 105 and STAs 115 have multiple antennas.

While the STAs 115 are capable of communicating with each other through the AP 105 using communication links 125, STAs 115 can also communicate directly with each other via direct wireless communication links 120. Direct wireless communication links 120 can occur between STAs 115 regardless of whether any of the STAs 115 are connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

The STAs 115 and APs 105 shown in FIG. 1 communicate according to the WLAN radio and baseband protocol including physical (PHY) and medium access control (MAC) layers from IEEE 802.11 and its various versions including, but not limited to, 802.11a, 802.11b, 802.11g, 802.11n, 802.11ac, 802.11ad, 802.11ah, 802.11aj, 802.11ax, 802.11ay, etc. Thus, WLAN 100 implements a contention-based protocol that allows a number of devices (e.g., STAs 115 and APs 105) to share the same wireless medium (e.g., a channel) without pre-coordination. To prevent several devices from transmitting over the channel at the same time, each device in the WLAN 100 operates according to certain procedures that structure and organize medium access, thereby preventing interference between the devices.

The STAs 115 and/or APs 105, include transmitters configured to generate and transmit waveforms on the medium that conform to spectral masking and/or flatness attributes. The transmitted waveform is a contiguous wideband waveform with a center frequency $f_c$, and a bandwidth $\beta$. In some examples, $\beta$ is 160 MHz. The spectral mask defines the shape or 'skirt' of the waveform outside of the bandwidth, e.g., on the leading edge and the trailing edge. The spectral flatness attributes generally define the flatness of the waveform across the waveform bandwidth.

Broadly, the spectral mask includes rolloff portions that establish how quickly the waveform drops from a peak transmit power (defined as 0 dBr or dB relative to the maximum spectral density of the waveform) across the bandwidth of the waveform to predefined power levels at given frequencies above and below the bandwidth. Each rolloff portion has an associated slope which defines how aggressively the power level drops. The spectral mask can include three rolloff portions, each rolloff portion having its own slope. Examples of slopes for the rolloff portions include, but are not limited to, $$\frac{\pm 3200}{\beta} \text{ dBr/MHz}$$

for a first rolloff portion, $$\frac{\pm 16.1}{\beta} \text{ dBr/MHz}$$

for a second rolloff portion, and $$\frac{\pm 24}{\beta} \text{ dBr/MHz}$$

for a third rolloff portion. Other examples of the slopes for the second rolloff portions are $$\frac{\pm 32.4}{\beta} \text{ dBr/MHz}$$

or $$\frac{\pm 28.18}{\beta} \text{ dBr/MHz}.$$

Other examples of the slopes for the third rolloff portions are $$\frac{\pm 48}{\beta} \text{ dBr/MHz}$$

or $\frac{\pm 6}{\beta}$ dBr/MHz.

Each rolloff portion includes an associated bandwidth measured with respect to $f_c$.

Broadly, the spectral flatness attribute defines the flatness of the bandwidth of the waveform. As previously discussed, the waveform includes many sub-carriers or tones (e.g., 2024 tones) that collectively form the contiguous wideband waveform. Although the tones collectively form the waveform, each tone is transmitted at a particular frequency and at a particular transmit power. In an ideal situation, every tone would be transmitted at the same power level. In reality, the spectral flatness attribute defines the amount of acceptable or maximum deviance in the transmit power for each tone, determined with respect to the particular region of the bandwidth the tone is located. The waveform includes three regions, an inner region (e.g., +1–165 tones from $f_c$), an intermediate region (e.g., between +/−165 and +/−696 tones from $f_c$), and an outer region (e.g., tones greater than +/−696 from $f_c$). Each region has its own maximum deviation. For example, tones in the inner and/or outer regions include a maximum deviation of +4/−6 dB and tones in the intermediate region include a maximum deviation of +/−4 dB.

The STAs 115, APs 105, or other devices (such as a spectrum analyzer device or a spectrum analyzer component of the STAs 115 and/or APs 105) support spectrum analysis of the transmitted waveform. That is, the transmitted waveform conforming to the described waveform attributes includes parameters that can be analyzed by the devices. The spectrum analysis is performed according to resolution bandwidth parameters, such as a 25 KHz resolution bandwidth. The 25 KHz resolution bandwidth ensures analysis of a waveform transmissions including 87.125 KHz sub-carrier spacing.

The spectrum analysis is also performed according to a video bandwidth parameter, such as a 7.5 KHz video bandwidth. For video bandwidth selection, periodicity and/or symbol duration of the waveform format is considered. For example, a high efficiency (HE) short training frame (STF) or (HE-STF) can have a different periodicity and/or symbol duration with respect to a HE long training frame (LTF) or (HE-LTF). Moreover, the HE-STF and HE-LTF can also have different periodicities and/or symbol durations with respect to data transmissions. For example, the per-tone power of a 1× HE-STF on the populated tones can be 3 dB higher than for 2×HE-STF. To address this, a long measurement period in number of OFDM symbols is used to provide averaging time so that the higher STF tone power on both the 1× and 2×HE-STF can be averaged out.

It is to be understood that aspects of the described spectral flatness, resolution bandwidth, and video bandwidth are not limited to a waveform having a $\beta$ of 160 MHz. Instead, the described techniques are equally applicable to $\beta$ of 20 MHz, 40 MHz, 80 MHz, 160 MHz, and 80+80 MHz (or a non-contiguous 160 MHz waveform).

Figure 2:
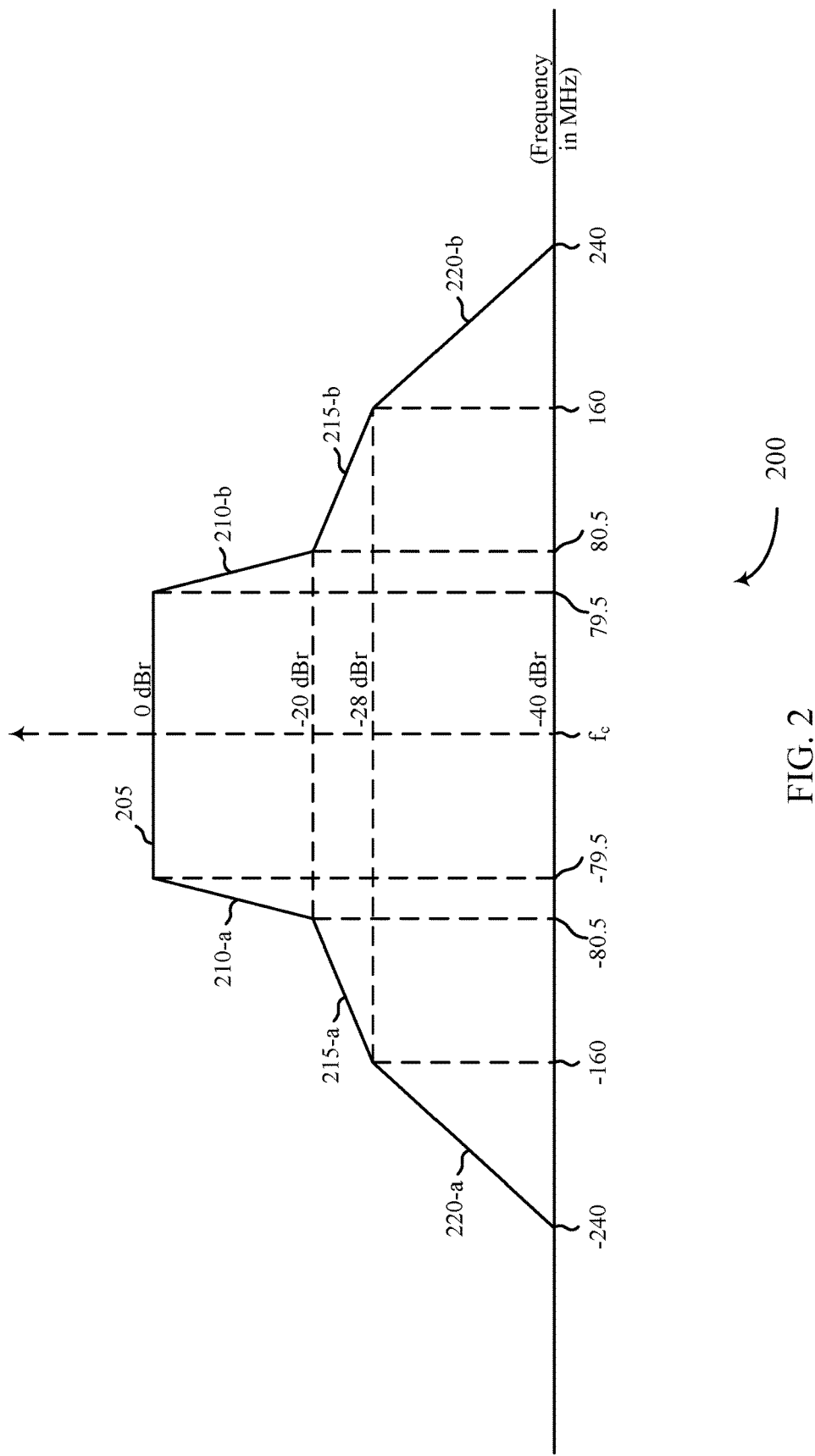
FIG. 2 shows an example of a spectral mask for a wideband contiguous waveform, in accordance with various aspects of the present disclosure.

FIG. 2 shows an example of a spectral mask 200 for a wideband contiguous waveform used in wireless communications. Aspects of the spectral mask 200 can be implemented by a wireless communication device, such as a STA 115 and/or an AP 105 described with reference to WLAN 100 of FIG. 1. The spectral mask 200 is for a contiguous wideband waveform having a bandwidth of β. The spectral mask 200 includes a bandwidth 205, a first rolloff portion 210, a second rolloff portion 215, and a third rolloff portion 220.

In some aspects, the spectral mask 200 can be a 160 MHz mask packet layer convergence protocol (PLCP) protocol data unit (PPDU) of HE format. The spectral mask 200 can have a 0 dBr bandwidth of 159 MHz, −20 dBr at 80.5 MHz frequency offset, −28 dBr at 160 MHz frequency offset, and −40 dBr at 240 MHz frequency offset and above. The spectral mask 200 for frequency offsets in between 79.5 and 80.5 MHz, 80.5 and 160 MHz and 160 and 240 MHz can be linearly interpolated in dB domain from the requirements for 79.5, 80.5, 160, and 240 MHz frequency offsets. In other aspects, the spectral mask 200 can be a 20 MHz, 40 MHz, 80 MHz, or 80+80 MHz mask PPDU of HE format.

In some examples, the frequency offsets associated with different rolloff points (e.g., the −20 dBr, −28 dBr, and −40 dBr points) can be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum. In one example, for a 20 MHz mask PPDU of HE format, the transmit spectrum may not exceed the maximum of the interim transmit spectral mask and −53 dBm/MHz at any frequency offset. In another example, for a 40 MHz mask PPDU of HE format, the transmit spectrum may not exceed the maximum of the interim transmit spectral mask and −56 dBm/MHz at any frequency offset. For an 80 MHz, 160 MHz, or 80+80 MHz mask PPDU of HE format, the transmit spectrum may not exceed the maximum of the interim transmit spectral mask and −59 dBm/MHz at any frequency offset.

In some aspects, the bandwidth 205 (also referred to as β) defines the bandwidth of the waveform and is measured with respect to the center frequency, fc. The bandwidth 205 can be 160 MHz, which is generally defined as +/−80 MHz (e.g., 80 MHz above fc and 80 MHz below fc). The bandwidth 205 is associated with a tone spacing. The tone spacing is a function of the bandwidth 205 divided by the number of tones (or sub-carriers) that are available and/or selected for use in the bandwidth 205. In one example, 2,024 tones are used with 87.125 KHz separation between the tones.

The bandwidth 205 conforms to spectral flatness attributes. For example, the bandwidth 205 can be divided into inner, intermediate, and outer regions, where each region includes associated tones. Each tone within a region is transmitted at a power level conforming to a maximum deviation for the region. The inner region constitutes the first 165 tones (or sub-carriers) above and below $f_c$ (e.g., +/−165 tones) and has a maximum deviation of between +4 dB and −6 dB. The intermediate region constitutes the tones between 165 and 696 above and below $f_c$ (e.g., +1−165−696 tones) and has a maximum deviation of +/−4 dB. The outer region constitutes tones 696 above and below $f_c$ (e.g., +/−696 and above tones) and has a maximum deviation of between +4 dB and −6 dB. Thus, the spectral flatness attribute of the bandwidth 205 provides for an average transmit power for tones across the bandwidth 205. As is understood, the actual transmit power of the average transmit power for tones across the bandwidth 205 varies depending upon various conditions, such as channel conditions, propagation distance, etc. For reference purposes, the average transmit power for tones across the bandwidth 205 is generally referred to as a 0 dBr transmit power.

Generally, the spectral flatness attributes can be a function of the local oscillator (LO) leakage of the transmitter. For example, the transmit LO leakage can conform to the described spectral flatness attributes for all β and, in some aspects, for all PPDU formats (e.g., high throughput (HT), very-high throughput (VHT), etc.). When the transmit radio frequency (RF) LO is in the center of the transmitted PPDU bandwidth, the power measured at the center of transmission bandwidth using resolution bandwidth of 25 KHz does not exceed the average power per-subcarrier (or tone) of the transmitted PPDU. When the transmit RF LO is not at the center of the transmitted PPDU bandwidth, the power measured at the location of the RF LO using resolution bandwidth of 25 KHz does not exceed the maximum of −32 dB relative to the total transmit power and −20 dBm. The transmit center frequency leakage is generally determined per transmit antenna.

As stated above, aspects of the spectral flatness attributes can be used for β other than 160 MHz. The maximum deviation for each region is based on the tone indices (or sub-carrier indices) for the region and β. As one example where β=20 MHz, an inner region and an outer region can be defined that constitutes tones between 2 and 84 and tones between 85 and 122, respectively, above and below $f_c$. The maximum deviation for the inner region tones is +/−4 dB and +4/−6 dB for the outer region tones. As an example where β=40 MHz, an inner region and an outer region can be defined that constitutes tones between 3 and 168 and tones between 169 and 244, respectively, above and below $f_c$. The maximum deviation for the inner region tones is +/−4 dB and +4/−6 dB for the outer region tones. As an example where β=80 MHz, an inner region and an outer region can be defined that constitutes tones between 3 and 344 and tones between 345 and 500, respectively, above and below $f_c$. The maximum deviation for the inner region tones is +/−4 dB and +4/−6 dB for the outer region tones.

As an example where β=160 MHz (either contiguous or non-contiguous), an inner region and an outer region can be defined that constitutes tones between −696 to −515 and −509 to −166 and +166 to +509 and +515 to +696 for the inner region, and tones between −1012 to −697 and −165 to −12 and +12 to 165 and +697 to +1012 for the outer region, above and below $f_c$. The maximum deviation is +/−4 dB for the inner region tones and +4/−6 dB for the outer region tones. In some aspects, the inner region tones can be used for measuring the average power as a reference to test the in-band waveform fluctuation.

As an example where β=80 MHz, an inner region and an outer region can be defined that constitutes tones between −344 to −3 and +3 to +344 for the inner region, and tones between −500 to −345 and +345 to +500 for the outer region, above and below $f_c$. The maximum deviation is +/−4 dB for the inner region tones and +4/−6 dB for the outer region tones. In some aspects, the inner region tones can be used for measuring the average power as a reference to test the in-band waveform fluctuation.

As an example where β=40 MHz, an inner region and an outer region can be defined that constitutes tones between −168 to −3 and +3 to +168 for the inner region, and tones between −244 to −169 and +169 to +244 for the outer region, above and below $f_c$. The maximum deviation is +/−4 dB for the inner region tones and +4/−6 dB for the outer region tones. In some aspects, the inner region tones can be used for measuring the average power as a reference to test the in-band waveform fluctuation.

As an example where β=20 MHz, an inner region and an outer region can be defined that constitutes tones between −84 to −2 and +2 to +84 for the inner region, and tones between −122 to −85 and +85 to +122 for the outer region, above and below $f_c$. The maximum deviation is +/−4 dB for the inner region tones and +4/−6 dB for the outer region tones. In some aspects, the inner region tones can be used for measuring the average power as a reference to test the in-band waveform fluctuation.

In some aspects, wireless devices may communicate using orthogonal frequency division multiple access (OFDMA) techniques and the 20 MHz, 40 MHz, 80 MHz, 160 MHz, or 80+80 MHz bandwidth may be divided into multiple resource units (RUs). As an example, some wireless devices may communicate using a first set of RUs and other wireless devices may communicate using a second set of RUs. As such, spectral flatness may be tested on used RUs and the averaging subcarrier indices and tested subcarrier indices may be equal to the tone indices in the used RU being tested. In some examples, the maximum allowed deviation of the transmit power associated with a set of tones (or subcarriers) in the RU being tested may be +4/−6 dB.

The spectral mask 200 also includes first rolloff portion 210, second rolloff portion 215, and third rolloff portion 220, that define the 'skirt' of the spectral mask. The spectral mask 200 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 210-a, 215-a, and 220-a, and the rolloff portions for the trailing edge are denoted as 210-b, 215-b, and 220-b. It is to be understood that the spectral mask 200 is symmetrical and therefore the leading and trailing edge skirts have similar attributes.

The first rolloff portion 210 generally defines the first power dropoff portion of the spectral mask 200 from the 0 dBr power level. The first rolloff portion 210 includes a 1 MHz bandwidth that is centered at the outer edges of the bandwidth 205, e.g., at ($f_c$+0.5β) and at ($f_c$−0.5β). When β is 160 MHz, the bandwidth of the first rolloff portion 210 is centered at +/−80 MHz from $f_c$ and the 1 MHz bandwidth spans between 79.5 MHz and 80.5 MHz above and below $f_c$. The first rolloff portion has a power dropoff from 0 dBr to −20 dBr. This defines an associated slope of the first rolloff portion 210 of $$\frac{\pm 3200}{\beta} \text{ dBr/MHz.}$$

The second rolloff portion 215 generally defines the second power dropoff portion of the spectral mask 200 from the −20 dBr power level. The second rolloff portion 215 includes a bandwidth having a size of 0.5(β−1 MHz). The bandwidth of the second rolloff portion 215 is centered at ($f_c$−0.75β+0.25 MHz) for the second rolloff portion 215-a and ($f_c$+0.75β−0.25 MHz) for the second rolloff portion 215-b. When β is 160 MHz, the bandwidth of the second rolloff portion 215 is 79.5 MHz and is centered at +120.25 MHz for second rolloff portion 215-b and centered at −120.25 MHz for the second rolloff portion 215-a, measured from $f_c$. When β is 160 MHz, the bandwidth of the second rolloff portions 215 span between 80.5 MHz and 160 MHz above and below $f_c$. The second rolloff portion 215 has a power dropoff from −20 dBr to −28 dBr. This defines an associated slope of the second rolloff portion 215 of $$\frac{\pm 16}{\beta} \text{ dBr/MHz.}$$

The third rolloff portion 220 generally defines the third power dropoff portion of the spectral mask 200 from the −28 dBr power level. The third rolloff portion 220 includes a bandwidth having a size of β/2. The bandwidth of the third rolloff portion 220 is centered at ($f_c$−1.25β) for the third rolloff portion 220-a and ($f_c$+1.25β) for the third rolloff portion 220-b. When β is 160 MHz, the bandwidth of the third rolloff portion 220 is centered at +/−200 MHz from $f_c$. When β is 160 MHz, the bandwidth of the third rolloff portions 220 span between 160 MHz and 240 MHz above and below $f_c$. The third rolloff portion 220 has a power dropoff from −28 dBr to −40 dBr. This defines an associated slope of the third rolloff portion 220 of $$\frac{\pm 24}{\beta} \text{ dBr/MHz.}$$

Thus, a wireless communication device, such as STAs 115 and/or APs 105, include a transmitter that is configured to generate a wideband contiguous waveform in a band, the waveform having an associated β and $f_c$. The transmitter is configured to transmit the waveform such that the waveform conforms to the spectral mask 200, e.g., conforms to the spectral mask and/or spectral flatness attributes. The band is a 5 GHz band, in some examples, and the bandwidth is 160 MHz.

Figure 3:
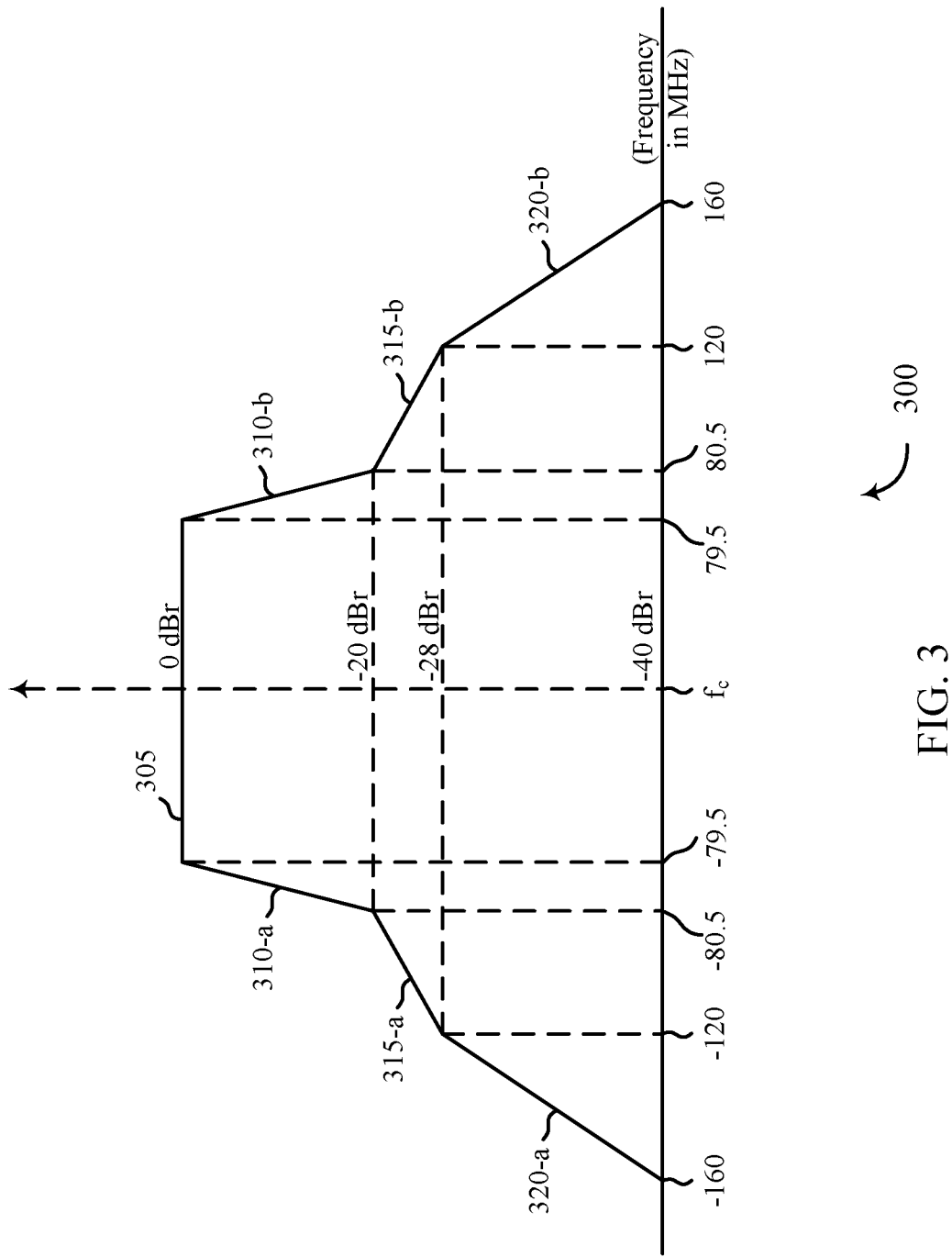
FIG. 3 shows an example of a spectral mask for a wideband contiguous waveform, in accordance with various aspects of the present disclosure.

FIG. 3 shows an example of a spectral mask 300 for a wideband contiguous waveform used in wireless communications. Aspects of the spectral mask 300 can be implemented by a wireless communication device, such as a STA 115 and/or an AP 105 described with reference to WLAN 100 of FIG. 1. The spectral mask 300 is for a contiguous wideband waveform having a bandwidth 305 of β. The spectral mask 300 includes the bandwidth 305, a first rolloff portion 310, a second rolloff portion 315, and a third rolloff portion 320.

In some aspects, the spectral mask 300 can be a 160 MHz mask PPDU of HE format. The spectral mask 300 can have a 0 dBr bandwidth of 159 MHz, −20 dBr at 80.5 MHz frequency offset, −28 dBr at 120 MHz frequency offset, and −40 dBr at 160 MHz frequency offset and above. The spectral mask 300 for frequency offsets in between 79.5 and 80.5 MHz, 80.5 and 120 MHz and 120 and 160 MHz can be linearly interpolated in dB domain from the requirements for 79.5, 80.5, 120, and 160 MHz frequency offsets. In other aspects, the spectral mask 200 can be a 20 MHz, 40 MHz, 80 MHz, or 80+80 MHz mask PPDU of HE format.

In some examples, the frequency offsets associated with different rolloff points (e.g., the −20 dBr, −28 dBr, and −40 dBr points) can be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum. For a 20 MHz mask PPDU of HE format, the transmit spectrum may not exceed the maximum of the interim transmit spectral mask and −53 dBm/MHz at any frequency offset. For a 40 MHz mask PPDU of HE format, the transmit spectrum may not exceed the maximum of the interim transmit spectral mask and −56 dBm/MHz at any frequency offset. For an 80 MHz, 160 MHz, or 80+80 MHz mask PPDU of HE format, the transmit spectrum may not exceed the maximum of the interim transmit spectral mask and −59 dBm/MHz at any frequency offset.

In some aspects, the bandwidth 305 (also referred to as (3) defines the bandwidth of the waveform and is measured with respect to the center frequency, fc. The bandwidth 305 can be 160 MHz, which is generally defined as +/−80 MHz (e.g., 80 MHz above fc and 80 MHz below fc). The bandwidth 305 is associated with a tone spacing. The tone spacing is a function of the bandwidth 305 divided by the number of tones (or sub-carriers) that are available and/or selected for use in the bandwidth 305. In one example, 2,024 tones are used with 87.125 KHz separation between the tones.

The bandwidth 305 conforms to spectral flatness attributes, such as described with respect to the spectral flatness attributes of spectral mask 200 of FIG. 2.

The spectral mask 300 also includes first rolloff portion 310, second rolloff portion 315, and third rolloff portion 320, that define the 'skirt' of the spectral mask 300. The spectral mask 300 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 310-a, 315-a, and 320-a, and the rolloff portions for the trailing edge are denoted as 310-b, 315-b, and 320-b. It is to be understood that the spectral mask 300 is symmetrical and therefore the leading and trailing edge skirts have similar attributes.

The first rolloff portion 310 generally defines the first power dropoff portion of the spectral mask 300 from the 0 dBr power level. The first rolloff portion 310 includes a 1 MHz bandwidth that is centered at the outer edges of the bandwidth 305, e.g., at ($f_c$+0.5β) and at ($f_c$−0.5β). When β is 160 MHz, the bandwidth of the first rolloff portion 310 is centered at +/−80 MHz from $f_c$ and the 1 MHz bandwidth spans between 79.5 MHz and 80.5 MHz above and below $f_c$. The first rolloff portion 310 has a power dropoff from 0 dBr to −20 dBr. This defines an associated slope of the first rolloff portion 310 of $$\frac{\pm 3200}{\beta} \text{ dBr/MHz.}$$

The second rolloff portion 315 generally defines the second power dropoff portion of the spectral mask 300 from the −20 dBr power level. The second rolloff portion 315 includes a bandwidth having a size of 0.25(β−2 MHz). The bandwidth of the second rolloff portion 315 is centered at ($f_c$−0.625β+0.25 MHz) for the second rolloff portion 315-a and ($f_c$+0.625β−0.25 MHz) for the second rolloff portion 315-b. When β is 160 MHz, the bandwidth of the second rolloff portion 315 is 39.5 MHz and is centered at +100.25 MHz for second rolloff portion 315-b and centered at −100.25 MHz for the second rolloff portion 315-a, measured from $f_c$. When β is 160 MHz, the bandwidth of the second rolloff portions 315 span between 80.5 MHz and 120 MHz above and below $f_c$. The second rolloff portion 315 has a power dropoff from −20 dBr to −28 dBr. This defines an associated slope of the second rolloff portion 215 of $$\frac{\pm 32.4}{\beta} \text{ dBr/MHz.}$$

The third rolloff portion 320 generally defines the third power dropoff portion of the spectral mask 300 from the −28 dBr power level. The third rolloff portion 320 includes a bandwidth having a size of β/4. The bandwidth of the third rolloff portion 320 is centered at ($f_c$−0.875β) for the third rolloff portion 320-a and ($f_c$+0.875β) for the third rolloff portion 320-b. When β is 160 MHz, the bandwidth of the third rolloff portion 320 is centered at +/−140 MHz from $f_c$. When β is 160 MHz, the bandwidth of the third rolloff portions 320 span between 120 MHz and 160 MHz above and below $f_c$. The third rolloff portion 320 has a power dropoff from −28 dBr to −40 dBr. This defines an associated slope of the third rolloff portion 220 of $$\frac{\pm 48}{\beta} \text{ dBr/MHz.}$$

Thus, a wireless communication device, such as STAs 115 and/or APs 105, include a transmitter that is configured to generate a wideband contiguous waveform in a band, the waveform having an associated β and $f_c$. The transmitter is configured to transmit the waveform such that the waveform conforms to the spectral mask 300, e.g., conforms to the spectral mask and/or spectral flatness attributes. The band is a 5 GHz band, in some examples, and the bandwidth is 160 MHz.

Figure 4:
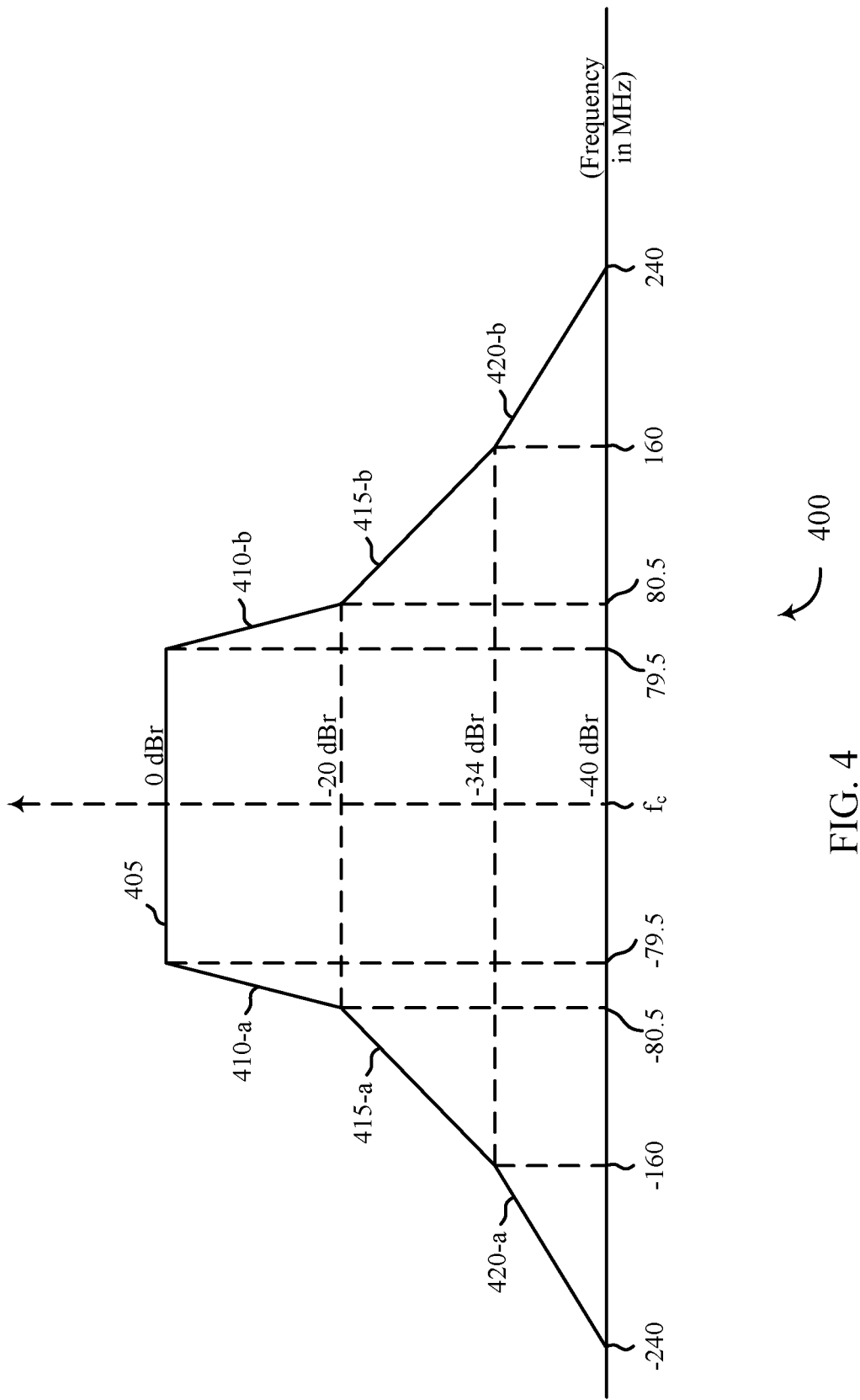
FIG. 4 shows an example of a spectral mask for a wideband contiguous waveform, in accordance with various aspects of the present disclosure.

FIG. 4 shows an example of a spectral mask 400 for a wideband contiguous waveform used in wireless communications. Aspects of the spectral mask 400 can be implemented by a wireless communication device, such as a STA 115 and/or an AP 105 described with reference to WLAN 100 of FIG. 1. The spectral mask 400 is for a contiguous wideband waveform having a bandwidth 405 of β. The spectral mask 400 includes the bandwidth 405, a first rolloff portion 410, a second rolloff portion 415, and a third rolloff portion 420.

In some aspects, the spectral mask 400 can be a 160 MHz mask PPDU of HE format. The spectral mask 400 can have a 0 dBr bandwidth of 159 MHz, −20 dBr at 80.5 MHz frequency offset, −34 dBr at 160 MHz frequency offset, and −40 dBr at 240 MHz frequency offset and above. The spectral mask 400 for frequency offsets in between 79.5 and 80.5 MHz, 80.5 and 160 MHz and 160 and 240 MHz can be linearly interpolated in dB domain from the requirements for 79.5, 80.5, 160, and 240 MHz frequency offsets. In other aspects, the spectral mask 200 can be a 20 MHz, 40 MHz, 80 MHz, or 80+80 MHz mask PPDU of HE format.

In some examples, the frequency offsets associated with different rolloff points (e.g., the −20 dBr, −34 dBr, and −40 dBr points) can be adjusted higher or lower to suit a particular application of the principles described herein. Similarly, the defined dBr values at each point can be adjusted higher or lower to suit a particular application of the principles described herein. In some aspects, there may be thresholds for the maximum values of the frequency offsets and defined dBr values for a transmit spectrum. For a 20 MHz mask PPDU of HE format, the transmit spectrum may not exceed the maximum of the interim transmit spectral mask and −53 dBm/MHz at any frequency offset. For a 40 MHz mask PPDU of HE format, the transmit spectrum may not exceed the maximum of the interim transmit spectral mask and −56 dBm/MHz at any frequency offset. For an 80 MHz, 160 MHz, or 80+80 MHz mask PPDU of HE format, the transmit spectrum may not exceed the maximum of the interim transmit spectral mask and −59 dBm/MHz at any frequency offset.

The bandwidth 405 (also referred to as (3)) defines the bandwidth of the waveform and is measured with respect to the center frequency, fc. The bandwidth 405 can be 160 MHz, which is generally defined as +/−80 MHz (e.g., 80 MHz above fc and 80 MHz below fc). The bandwidth 405 is associated with a tone spacing. The tone spacing is a function of the bandwidth 405 divided by the number of tones (or sub-carriers) that are available and/or selected for use in the bandwidth 405. In one example, 2,024 tones are used with 87.125 KHz separation between the tones.

The bandwidth 405 conforms to spectral flatness attributes, such as described with respect to the spectral flatness attributes of spectral mask 200 of FIG. 2.

The spectral mask 400 also includes first rolloff portion 410, second rolloff portion 415, and third rolloff portion 420, that define the 'skirt' of the spectral mask 400. The spectral mask 400 includes a skirt on the leading edge (e.g., frequencies below and approaching $f_c$) as well as a skirt on the trailing edge (e.g., frequencies above and departing from $f_c$). For ease of reference, the rolloff portions for the leading edge are denoted as 410-a, 415-a, and 420-a, and the rolloff portions for the trailing edge are denoted as 410-b, 415-b, and 420-b. It is to be understood that the spectral mask 400 is symmetrical and therefore the leading and trailing edge skirts have similar attributes.

The first rolloff portion 410 generally defines the first power dropoff portion of the spectral mask 400 from the 0 dBr power level. The first rolloff portion 410 includes a 1 MHz bandwidth that is centered at the outer edges of the bandwidth 405, e.g., at $(f_c+0.5\beta)$ and at $(f_c-0.5(\beta))$. When $\beta$ is 160 MHz, the bandwidth of the first rolloff portion 410 is centered at +/−80 MHz from $f_c$ and the 1 MHz bandwidth spans between 79.5 MHz and 80.5 MHz above and below $f_c$. The first rolloff portion 410 has a power dropoff from 0 dBr to −20 dBr. This defines an associated slope of the first rolloff portion 410 of $$\frac{\pm 3200}{\beta} \text{ dBr/MHz.}$$

The second rolloff portion 415 generally defines the second power dropoff portion of the spectral mask 400 from the −20 dBr power level. The second rolloff portion 415 includes a bandwidth having a size of 0.5(β−1 MHz). The bandwidth of the second rolloff portion 415 is centered at $(f_c-0.75\beta+0.25$ MHz$)$ for the second rolloff portion 415-a and $(f_c+0.75\beta-0.25$ MHz$)$ for the second rolloff portion 415-b. When β is 160 MHz, the bandwidth of the second rolloff portion 415 is 79.5 MHz and is centered at +120.25 MHz for second rolloff portion 415-b and centered at −120.25 MHz for the second rolloff portion 415-a, measured from $f_c$. When β is 160 MHz, the bandwidth of the second rolloff portions 415 span between 80.5 MHz and 160 MHz above and below $f_c$. The second rolloff portion 415 has a power dropoff from −20 dBr to −34 dBr. This defines an associated slope of the second rolloff portion 415 of $$\frac{\pm 28.18}{\beta} \text{ dBr/MHz.}$$

The third rolloff portion 420 generally defines the third power dropoff portion of the spectral mask 400 from the −34 dBr power level. The third rolloff portion 420 includes a bandwidth having a size of β/2. The bandwidth of the third rolloff portion 420 is centered at $(f_c-1.25\beta)$ for the third rolloff portion 420-a and $(f_c+1.25\beta)$ for the third rolloff portion 420-b. When β is 160 MHz, the bandwidth of the third rolloff portion 420 is centered at +/−200 MHz from $f_c$. When β is 160 MHz, the bandwidth of the third rolloff portions 420 span between 160 MHz and 240 MHz above and below $f_c$. The third rolloff portion 420 has a power dropoff from −34 dBr to −40 dBr. This defines an associated slope of the third rolloff portion 220 of $$\frac{\pm 6}{\beta} \text{ dBr/MHz.}$$

Thus, a wireless communication device, such as STAs 115 and/or APs 105, include a transmitter that is configured to generate a wideband contiguous waveform in a band, the waveform having an associated β and $f_c$. The transmitter is configured to transmit the waveform such that the waveform conforms to the spectral mask 400, e.g., conforms to the spectral mask and/or spectral flatness attributes. The band is a 5 GHz band, in some examples, and the bandwidth is 160 MHz.

Figure 5:
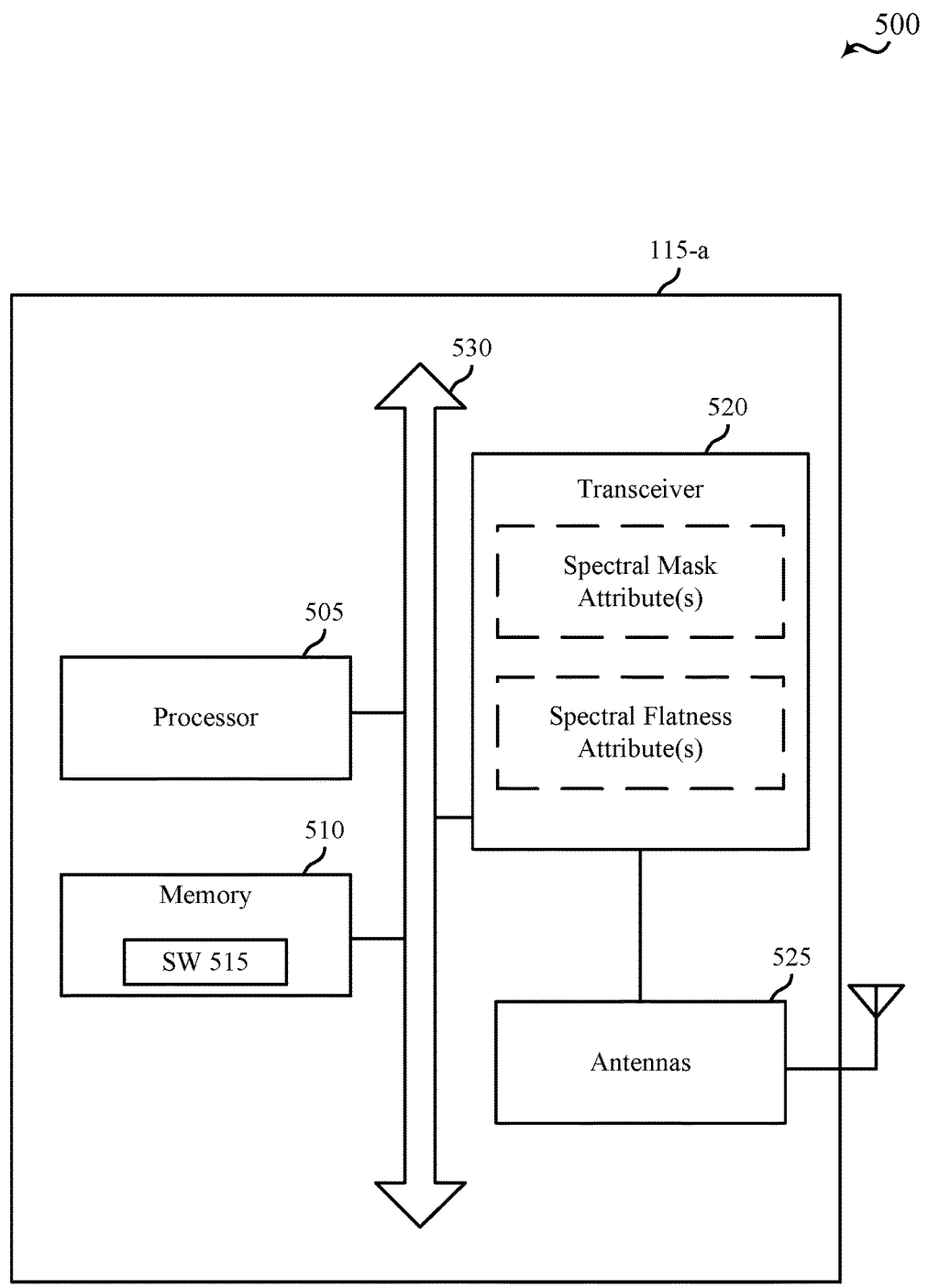
FIG. 5 shows a block diagram of an example of a wireless station that supports spectral mask and flatness, in accordance with various aspects of the present disclosure.

FIG. 5 shows a block diagram 500 of an example STA 115-a that supports spectral masking and/or flatness attributes in accordance with various aspects of the present disclosure, and with respect to FIGS. 1-4. The STA 115-a includes a processor 505, a memory 510, and a transceiver 520 each of which is communicatively coupled with a bus 530 enabling communication between these components. The antennas 525 are communicatively coupled with the transceiver 520.

The processor 505 is an intelligent hardware device, such as a central processing unit (CPU), a microcontroller, an application-specific integrated circuit (ASIC), etc. The processor 505 processes information received through the transceiver 520 and information to be sent to the transceiver 520 for transmission through the antenna(s) 525.

The memory 510 stores computer-readable, computer-executable software (SW) code 515 containing instructions that, when executed, cause the processor 505 or another one of the components of the STA 115-a to perform aspects of the various functions described herein, for example, contiguous wideband waveform generation and transmission that conforms to spectral masking and/or flatness attributes.

The transceiver 520 communicates bi-directionally with other wireless devices, such as APs 105, STAs 115, or other devices. The transceiver 520 includes a transmitter portion that is configured to support generating and transmitting a wideband contiguous waveform that conforms to the described spectral mask attributes and/or spectral flatness attributes. That is, the transceiver 520 includes components, hardware configuration, etc., that generates and transmits the waveform having the rolloff portions conforming to the spectral mask attributes, such as the first rolloff portions 210/310/410, the second rolloff portions 215/315/415, and the third rolloff portions 220/320/420, described with reference to FIGS. 2-4, respectively. The transceiver 520 also includes components, hardware configuration, etc., that generates and transmits the waveform having the bandwidth 205/305/405 conforming to the flatness attributes described with reference to FIGS. 2-4, respectively. Generally, the transceiver 520 is used to encode, interleave, modulate, and multiplex packets and frames for WLAN transmissions over the antennas 525. The transceiver 520 also includes a receiver portion that is used to demodulate, multiplex, deinterleave, and decode WLAN packets received from the antenna(s) 525.

FIG. 5 shows only one possible implementation of a device executing the features of FIGS. 1-4. While the components of FIG. 5 are shown as discrete hardware blocks (e.g., ASICs, field programmable gate arrays (FPGAs), semi-custom integrated circuits, etc.) for purposes of clarity, it will be understood that each of the components can also be implemented by multiple hardware blocks adapted to execute some or all of the applicable features in hardware. Alternatively, features of two or more of the components of FIG. 5 can be implemented by a single, consolidated hardware block. For example, a single transceiver 520 chip can implement the processor 505 and/or memory 510.

Figure 6:
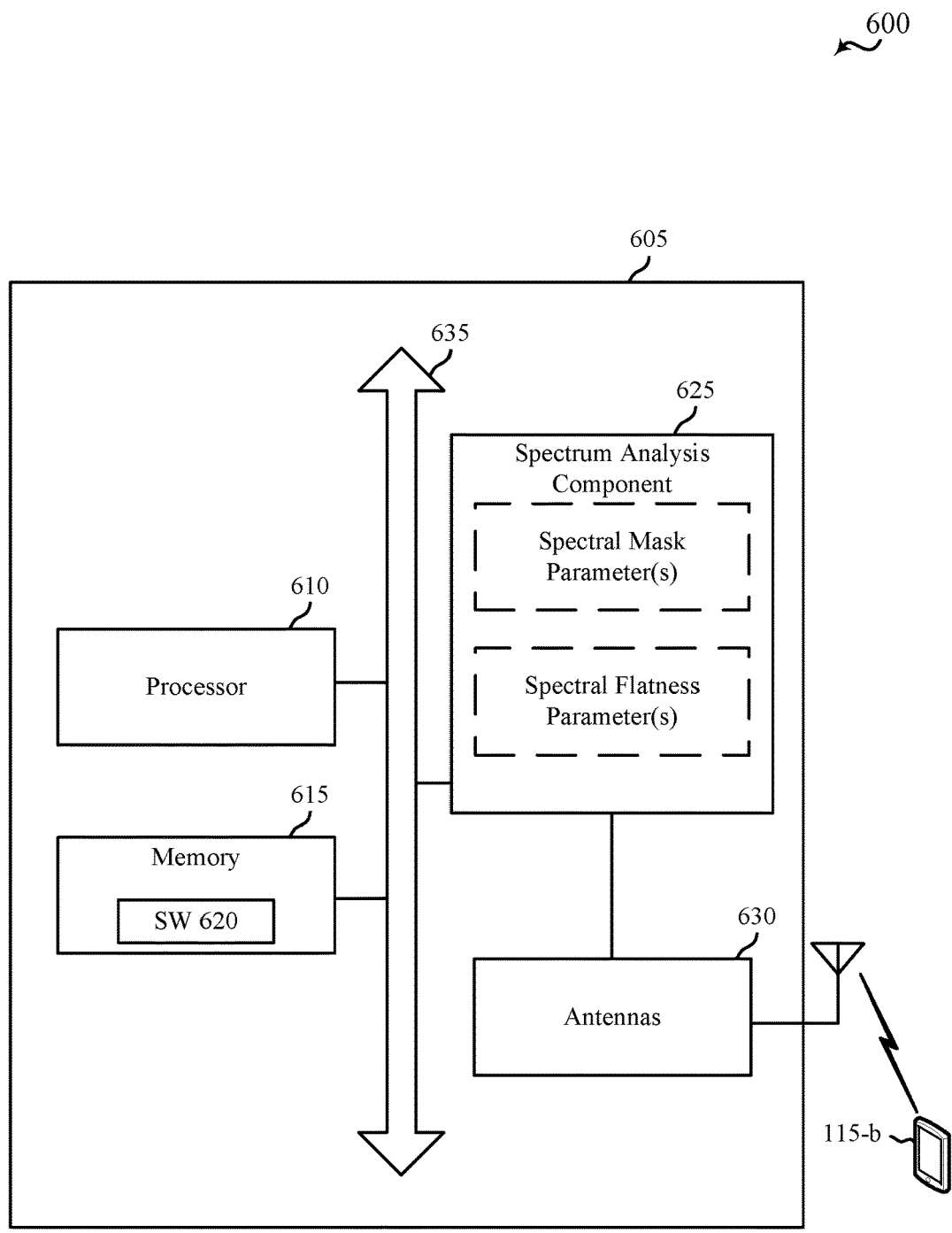
FIG. 6 shows a block diagram of an example of a spectrum analyzer that supports spectral analysis, in accordance with various aspects of the present disclosure.

FIG. 6 shows a block diagram 600 of an example device 605 that supports spectral masking and/or flatness attributes in accordance with various aspects of the present disclosure, and with respect to FIGS. 1-4. The device 605 can be an example of a STA 115, an AP 105, or any other device configured to support spectrum analysis of a wideband contiguous waveform, as described with reference to FIGS. 1-4. In some examples, the device 605 is a spectrum analyzer. The device 605 includes a processor 610, a memory 615, and a spectrum analysis component 625, each of which is communicatively coupled with a bus 635 enabling communication between these components. The antennas 630 are communicatively coupled with the spectrum analysis component 625.

The processor 610 is an intelligent hardware device, such as a central processing unit (CPU), a microcontroller, an application-specific integrated circuit (ASIC), etc. The processor 610 processes information received through the spectrum analysis component 625 through the antenna(s) 630.

The memory 615 stores computer-readable, computer-executable software (SW) code 620 containing instructions that, when executed, cause the processor 610 or another one of the components of the device 605 to perform aspects of the various functions described herein, for example, spectrum analysis of contiguous wideband waveforms transmitted by other wireless devices, such as STA 115-*b*.

The spectrum analysis component 625 receives waveforms transmitted from other wireless devices, such as APs 105, STAs 115, or other devices. The spectrum analysis component 625 supports performing spectrum analysis of the received waveforms that conforms to the described spectral mask attributes and/or spectral flatness attributes. That is, the spectrum analysis component 625 includes components, hardware configuration, etc., that support various spectrum analysis attributes. Examples of spectrum analysis attributes include, but are not limited to, a resolution bandwidth of 25 KHz and/or a video bandwidth resolution of 7.5 KHz. The spectrum analysis component 625 provides an output to the processor 610, for example, for further processing and/or presentation. In some aspects, the spectrum analysis component 625 provides a mechanism to confirm that the wideband contiguous waveform under analysis conforms to the described spectral mask attributes as well as the flatness attributes.

Figure 7:
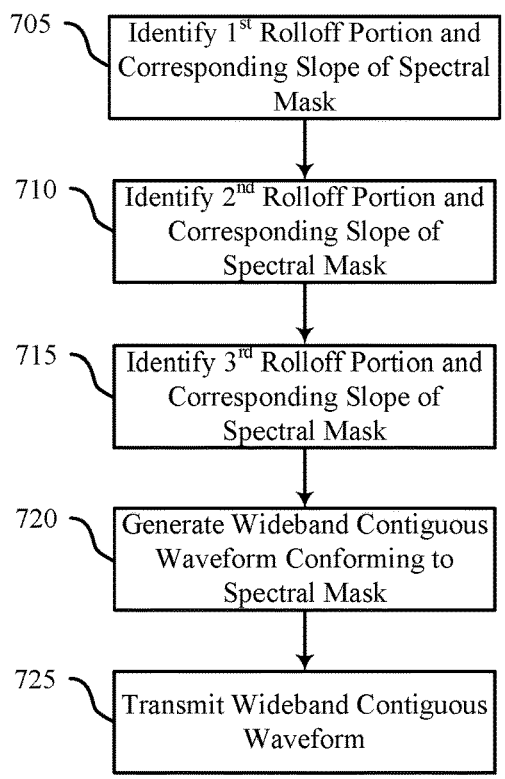
FIGS. 7 through 9 show flow charts that illustrate example methods for wireless communications, in accordance with various aspects of the present disclosure.

FIG. 7 shows a flow chart that illustrates one example of a method 700 for wireless communication, in accordance with various aspects of the present disclosure. The method 700 can be performed by any of the STAs 115 and/or APs 105 discussed in the present disclosure, but for clarity the method 700 will be described from the perspective of a STA 115.

Broadly speaking, the method 700 illustrates a procedure by which the STA 115 performs WLAN communications that include wideband contiguous waveforms conforming to spectral masking attributes. For example, the STA 115 identifies the rolloff portions of the waveform, generates, and transmits the waveform that conforms to the identified rolloff portions. The waveform includes a center frequency $f_c$, and a bandwidth $\beta$. The bandwidth $\beta$ is 160 MHz, in some examples, and is transmitted in the 5 GHz band.

The method 700 begins at block 705 where the STA 115 identifies the first rolloff portion. The STA 115 identifies the bandwidth of the rolloff portion, the power level drop that occurs with the rolloff portion, and the associated slope of the rolloff portion. The first rolloff portion can include a 1 MHz bandwidth and have an associated slope of $$\frac{\pm 3200}{\beta} \text{ dBr/MHz.}$$

When $\beta$ is 160 MHz, the first rolloff portion can span the frequency ranges 79.5 to 80.5 above and below $f_c$.

The method 700 continues at block 710 where the STA 115 identifies the second rolloff portion for the waveform. The STA 115 identifies the bandwidth of the second rolloff portion, the power level drop that occurs with the second rolloff portion, and the associated slope of the second rolloff portion. When $\beta$ is 160 MHz, the second rolloff portion can include a bandwidth of 39.5 MHz or a bandwidth of 79.5 MHz. The second rolloff portion can have associated slopes of $$\frac{\pm 16.1}{\beta}, \frac{\pm 32.4}{\beta}, \text{ or } \frac{\pm 28.18}{\beta} \text{ dBr/MHz.}$$

When $\beta$ is 160 MHz, the second rolloff portion can span the frequency ranges 80.5 MHz to 160 MHz or 80.5 MHz to 120 MHz above and below $f_c$.

The method 700 continues at block 715 where the STA 115 identifies the third rolloff portion for the waveform. The STA 115 identifies the bandwidth of the third rolloff portion, the power level drop that occurs with the third rolloff portion, and the associated slope of the third rolloff portion. When $\beta$ is 160 MHz, the third rolloff portion can include a bandwidth of 40 MHz or a bandwidth of 80 MHz. The third rolloff portion can have associated slopes of $$\frac{\pm 24}{\beta}, \frac{\pm 48}{\beta}, \text{ or } \frac{\pm 6}{\beta} \text{ dBr/MHz.}$$

When $\beta$ is 160 MHz, the third rolloff portion can span the frequency ranges 120 MHz to 160 MHz or 160 MHz to 240 MHz above and below $f_c$.

The method 700 continues at block 720 where the STA 115 generates the wideband contiguous waveform in the band, e.g., the 5 GHz radio frequency spectrum band. The STA 115 generates the waveform using hardware selected or otherwise configured to comply with the rolloff portions of the spectral mask.

The method 700 continues at block 725 where the STA 115 transmits the wideband contiguous waveform using a transmitter. The STA 115 transmits the waveform using transmitter hardware selected or otherwise configured to comply with the spectral mask including the identified rolloff portions.

Figure 8:
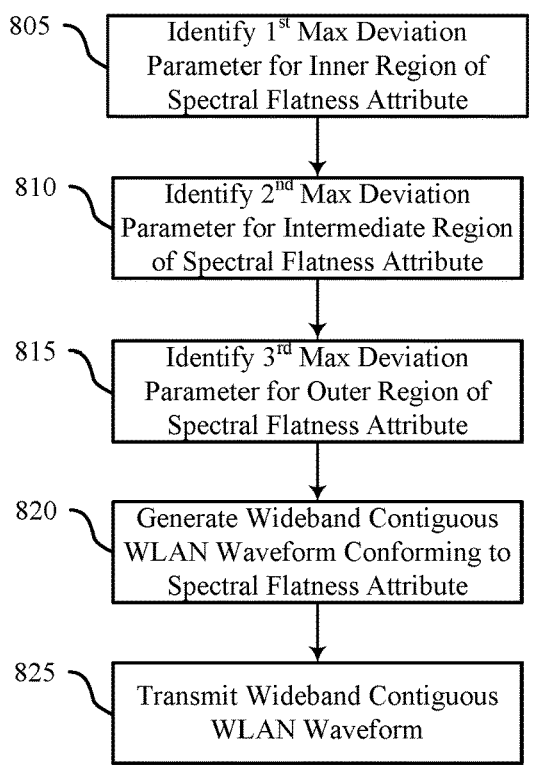

FIG. 8 shows a flow chart that illustrates one example of a method 800 for wireless communication, in accordance with various aspects of the present disclosure. The method 800 can be performed by any of the STAs 115 and/or APs 105 discussed in the present disclosure, but for clarity the method 800 will be described from the perspective of a STA 115.

Broadly speaking, the method 800 illustrates a procedure by which the STA 115 performs WLAN communications that include wideband contiguous waveforms conforming to spectral flatness attributes. For example, the STA 115 identifies the regions of the bandwidth of the waveform, identifies the maximum transmit power deviation for tones (or sub-carriers) within each region, and generates and transmits the waveform that conforms to the identified spectral flatness attributes. The waveform includes a center frequency $f_c$ and a bandwidth $\beta$. The bandwidth $\beta$ is 160 MHz, in some examples, and is transmitted in the 5 GHz band.

The method 800 begins at block 805 where the STA 115 identifies the first maximum deviation parameter for the inner region of the bandwidth. The STA 115 identifies the tones forming the inner region (e.g., the 165 above and below $f_c$). The STA 115 identifies the maximum transmit power deviation for the tones within the inner region. In some examples, the maximum deviation for the inner region tones is +4 dB/−6 dB.

The method 800 continues at block 810 where the STA 115 identifies the second maximum deviation parameter for the intermediate region of the bandwidth. The STA 115 identifies the tones forming the intermediate region (e.g., the tones between 165 and 696 above and below $f_c$). The STA 115 identifies the maximum transmit power deviation for the tones within the intermediate region. In some examples, the maximum deviation for the intermediate region tones is +/−4 dB.

The method 800 continues at block 815 where the STA 115 identifies the third maximum deviation parameter for the outer region of the bandwidth. The STA 115 identifies the tones forming the outer region (e.g., tones above 696 above and below $f_c$). The STA 115 identifies the maximum transmit power deviation for the tones within the outer region. In some examples, the maximum deviation for the outer region tones is +4 dB/−6 dB.

The method 800 continues at block 820 where the STA 115 generates the wideband contiguous waveform in the band, e.g., the 5 GHz radio frequency spectrum band. The STA 115 generates the waveform using hardware selected or otherwise configured to comply with the spectral flatness attributes for each region of the waveform bandwidth.

The method 800 continues at block 825 where the STA 115 transmits the wideband contiguous waveform using a transmitter. The STA 115 transmits the waveform using transmitter hardware selected or otherwise configured to comply with the spectral flatness attributes.

Figure 9:
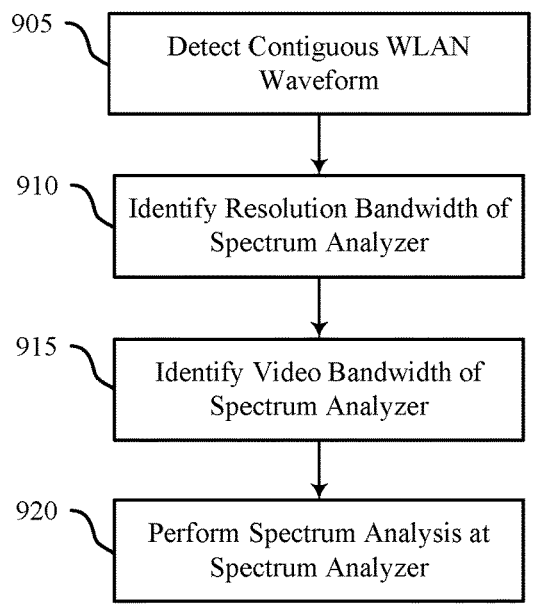

FIG. 9 shows a flow chart that illustrates one example of a method 900 for performing spectrum analysis of a waveform used for wireless communication, in accordance with various aspects of the present disclosure. The method 900 can be performed by any of the STAs 115, APs 105, and/or spectrum analyzers discussed in the present disclosure, but for clarity the method 900 will be described from the perspective of a spectrum analyzer.

Broadly speaking, the method 900 illustrates a procedure by which the spectrum analyzer performs spectrum analysis of a wideband contiguous waveform conforming to spectral masking and flatness attributes. For example, the spectrum analyzer identifies various resolution bandwidth parameters used for analyzing the waveform. The waveform includes a center frequency $f_c$ and a bandwidth $\beta$. The bandwidth $\beta$ is 160 MHz, in some examples, and is transmitted in the 5 GHz band.

The method 900 begins at block 905 where the spectrum analyzer detects a contiguous WLAN waveform. The waveform can be transmitted by a STA 115 and/or an AP 105. The method 900 continues at block 910 where the spectrum analyzer identifies a resolution bandwidth of the spectrum analyzer. The resolution bandwidth supports analysis of the waveform transmitted conforming to the described spectral masking and flatness attributes. The resolution bandwidth can be 25 KHz.

The method 900 continues at block 915 where the spectrum analyzer identifies a video bandwidth of the spectrum analyzer. The video bandwidth supports analysis of the waveform transmitted conforming to the described spectral masking and flatness attributes, particularly when video signals are encoded in the waveform. The video bandwidth can be 7.5 KHz.

The method 900 continues at block 920 where the spectrum analyzer performs spectrum analysis of the detected waveform. The spectrum analysis can include confirmation that the waveform conforms to the described spectral masking and flatness attributes, e.g., comparing the analyzed waveform to predefined attributes.

The methods 700-900 of FIGS. 7-9 provide for wireless communications at a STA, an AP, a spectrum analyzer, or other communication device. It should be noted that these methods are just example implementations and that the operations thereof may be rearranged or otherwise modified such that other implementations are possible. For example, aspects from the methods 700-900 may be combined with other aspects, such as those described with reference to FIGS. 1-4.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
generating, by a wireless communication device, a wideband contiguous waveform comprising a predefined band comprising a bandwidth ($\beta$), a center frequency (fc), and a number of tones in the bandwidth ($\beta$), the number of tones comprising 2,024 tones; and
transmitting the wideband contiguous waveform using a transmitter conforming to a spectral mask;
wherein the spectral mask comprises a 0 dBr bandwidth of 159 MHz, a −20 dBr point at an 80.5 MHz frequency offset from the center frequency, a −28 dBr point at a 160 MHz frequency offset from the center frequency, and a −40 dBr point at 240 MHz frequency offset and higher from the center frequency.

2. The method of claim 1, wherein $\beta$=160 MHz.

3. The method of claim 1, wherein a tone spacing of $\beta$ is a function of $\beta$ divided by the number of tones.

4. The method of claim 3, wherein the bandwidth ($\beta$) comprises an inner region and an outer region, the inner region comprising subcarriers from −696 to −515, from −509 to −166, from +166 to +509, and from +515 to +696 from fc, and
the outer region comprising subcarriers from −1012 to −697, from −165 to −12, from +12 to +165, and from +697 to +1012 from fc.

5. The method of claim 1, wherein the spectral mask further comprises a first rolloff portion of 20 dBr/MHz between a 0 dBr bandwidth point at a 79.5 MHz frequency offset from the center frequency and the −20 dBr point at the 80.5 MHz frequency offset from the center frequency.

6. The method of claim 1, wherein transmitting the wideband contiguous waveform comprises:
transmitting a 160 MHz packet layer convergence protocol (PLCP) protocol data unit (PPDU) of a high efficiency (HE) format using the transmitter conforming to the spectral mask.

7. A method for wireless communication, comprising:
generating, by a wireless communication device, a wideband contiguous waveform comprising a predefined band comprising a bandwidth ($\beta$), a center frequency (fc), and a number of tones in the bandwidth ($\beta$), the number of tones comprising 2,024 tones; and
transmitting the wideband contiguous waveform using a transmitter conforming to a spectral mask;
wherein the spectral mask comprises a 0 dBr bandwidth of 159 MHz, a −20 dBr point at an 80.5 MHz frequency offset from the center frequency, a −28 dBr point at a 120 MHz frequency offset from the center frequency, and a −40 dBr point at a 160 MHz frequency offset and higher from the center frequency.

8. The method of claim 7, wherein $\beta$=160 MHz.

9. A method for wireless communication, comprising:
generating, by a wireless communication device, a wideband contiguous waveform comprising a predefined band comprising a bandwidth ($\beta$), a center frequency (fc), and a number of tones in the bandwidth ($\beta$), the number of tones comprising 2,024 tones; and
transmitting the wideband contiguous waveform using a transmitter conforming to a spectral mask;
wherein the spectral mask comprises a 0 dBr bandwidth of 159 MHz, a −20 dBr point at an 80.5 MHz frequency offset from the center frequency, a −34 dBr point at a 160 MHz frequency offset from the center frequency, and a −40 dBr point at a 240 MHz frequency offset and higher from the center frequency.

10. The method of claim 9, wherein β=160 MHz.

11. An apparatus for wireless communication, comprising:
 a wireless communication device to generate a wideband contiguous waveform comprising a predefined band comprising a bandwidth (β), a center frequency (fc), and a number of tones in the bandwidth (β), the number of tones comprising 2,024 tones;
 a transmitter to transmit the wideband contiguous waveform conforming to a spectral mask;
 wherein the spectral mask comprises a 0 dBr bandwidth of 159 MHz, a −20 dBr point at an 80.5 MHz frequency offset from the center frequency, a −28 dBr point at a 160 MHz frequency offset from the center frequency, and a −40 dBr point at 240 MHz frequency offset and higher from the center frequency.

12. The apparatus of claim 11, wherein β=160 MHz.

13. The apparatus of claim 11, wherein a tone spacing of β is a function of β divided by the number of tones.

14. The method of claim 13, wherein the bandwidth (β) comprises an inner region and an outer region, the inner region comprising subcarriers from −696 to −515, from −509 to −166, from +166 to +509, and from +515 to +696 from fc, and
 the outer region comprising subcarriers from −1012 to −697, from −165 to −12, from +12 to +165, and from +697 to +1012 from fc.

15. The apparatus of claim 11, wherein the spectral mask comprises a first rolloff portion of 20 dBr/MHz between a 0 dBr bandwidth point at a 79.5 MHz frequency offset from the center frequency and the −20 dBr point at the 80.5 MHz frequency offset from the center frequency.

16. The apparatus of claim 11, wherein the transmitter to transmit the wideband contiguous waveform comprises:
 the transmitter to transmit a 160 MHz packet layer convergence protocol (PLCP) protocol data unit (PPDU) of a high efficiency (HE) format conforming to the spectral mask.

17. An apparatus for wireless communication, comprising:
 a wireless communication device to generate a wideband contiguous waveform comprising a predefined band comprising a bandwidth (β), a center frequency (fc), and a number of tones in the bandwidth (β), the number of tones comprising 2,024 tones; and
 a transmitter to transmit the wideband contiguous waveform conforming to a spectral mask;
 wherein the spectral mask comprises a 0 dBr bandwidth of 159 MHz, a −20 dBr point at an 80.5 MHz frequency offset from the center frequency, a −28 dBr point at a 120 MHz frequency offset from the center frequency, and a −40 dBr point at a 160 MHz frequency offset and higher from the center frequency.

18. The apparatus of claim 17, wherein β=160 MHz.

19. An apparatus for wireless communication, comprising:
 a wireless communication device to generate a wideband contiguous waveform comprising a predefined band comprising a bandwidth (β), a center frequency (fc), and a number of tones in the bandwidth (β), the number of tones comprising 2,024 tones; and
 a transmitter to transmit the wideband contiguous waveform conforming to a spectral mask;
 wherein the spectral mask comprises a 0 dBr bandwidth of 159 MHz, a −20 dBr point at an 80.5 MHz frequency offset from the center frequency, a −34 dBr point at a 160 MHz frequency offset from the center frequency, and a −40 dBr point at a 240 MHz frequency offset and higher from the center frequency.

20. The apparatus of claim 19, wherein β=160 MHz.

\* \* \* \* \*